US012773620B2

(12) United States Patent
Barcias

(10) Patent No.: US 12,773,620 B2
(45) Date of Patent: Oct. 27, 2026

(54) HAPTIC OUTPUT SIGNAL ADJUSTMENT

(71) Applicant: Sony Interactive Entertainment Inc., Tokyo (JP)

(72) Inventor: Jesus Lucas Barcias, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 206 days.

(21) Appl. No.: 18/584,032

(22) Filed: Feb. 22, 2024

(65) Prior Publication Data

US 2024/0286030 A1 Aug. 29, 2024

(30) Foreign Application Priority Data

Feb. 28, 2023 (GB) ..................................... 2302926

(51) Int. Cl.
*A63F 13/285* (2014.01)
*A63F 13/58* (2014.01)
*A63F 13/655* (2014.01)
*A63F 13/79* (2014.01)

(52) U.S. Cl.
CPC ............ *A63F 13/285* (2014.09); *A63F 13/58* (2014.09); *A63F 13/655* (2014.09); *A63F 13/79* (2014.09); *A63F 2300/8082* (2013.01)

(58) Field of Classification Search
CPC ...... A63F 13/285; A63F 13/58; A63F 13/655; A63F 13/79; A63F 2300/8082
USPC ........................................................... 463/31
See application file for complete search history.

(56) References Cited

U.S. PATENT DOCUMENTS 9,588,586 B2 * 3/2017 Rihn ........................ G06T 15/20
10,684,690 B2 * 6/2020 Keller ...................... G06F 3/011
10,775,894 B2 * 9/2020 Maalouf ................ G06N 20/00
2013/0106691 A1 5/2013 Rank
2013/0198625 A1 8/2013 Anderson et al.
2014/0274398 A1 9/2014 Grant
2015/0033588 A1 2/2015 Lai
2015/0070148 A1 3/2015 Cruz-Hernandez et al.
2016/0175718 A1 6/2016 Yoo
2016/0184703 A1 * 6/2016 Brav ..................... A63F 13/213 463/30
2017/0127753 A1 5/2017 Kohatsu et al.
2017/0185152 A1 6/2017 Keller et al.
(Continued)

FOREIGN PATENT DOCUMENTS

CN 114185423 A 3/2022

OTHER PUBLICATIONS

Combined Search and Examination Report for corresponding GB Application No. 2302926.7, 4 pages, Jan. 17, 2024.

*Primary Examiner* — Allen Chan
(74) *Attorney, Agent, or Firm* — Fish & Richardson P.C.

(57) ABSTRACT

An entertainment system includes circuitry configured to generate a virtual environment comprising a virtual character, where actions performed by the virtual character are associated, according to a control scheme, with input signals from an input device operable to produce a haptic output, obtain a haptic output signal corresponding to a state of the virtual environment, determine a characteristic of the virtual character, determine, based on the characteristic of the virtual character, a haptic adjustment property, perform processing to adjust the haptic output signal, responsive to the haptic adjustment property, and output the adjusted haptic output signal to the input device.

20 Claims, 12 Drawing Sheets

(56) References Cited

U.S. PATENT DOCUMENTS

| | | | | |
|---|---|---|---|---|
| 2018/0027893 | A1 | 2/2018 | Bangera et al. | |
| 2019/0223812 | A1 | 7/2019 | Boyd | |
| 2019/0302887 | A1* | 10/2019 | Sinclair .................... | G05G 5/03 |
| 2019/0311590 | A1 | 10/2019 | Doy et al. | |
| 2019/0384404 | A1 | 12/2019 | Raghoebardajal | |
| 2021/0012628 | A1 | 1/2021 | Doy et al. | |
| 2021/0048878 | A1 | 2/2021 | Pilot | |
| 2021/0052980 | A1 | 2/2021 | Lindemann et al. | |
| 2021/0373670 | A1 | 12/2021 | Shi et al. | |
| 2022/0047954 | A1 | 2/2022 | Shi et al. | |
| 2022/0062766 | A1 | 3/2022 | Dom et al. | |
| 2022/0165239 | A1 | 5/2022 | Wu | |
| 2024/0038084 | A1 | 2/2024 | Marggraff et al. | |
| 2024/0293735 | A1 | 9/2024 | Henderson et al. | |
| 2024/0295927 | A1 | 9/2024 | Eder et al. | |
| 2025/0004559 | A1 | 1/2025 | Tirmizi et al. | |
| 2025/0076986 | A1 | 3/2025 | Xu et al. | |
| 2025/0387699 | A1 | 12/2025 | Olabode et al. | |

* cited by examiner

Fig. 11

1100

| User | Height (cm) | Weight (kg) | Age (yrs) | Silhouette area ($m^2$) | Strength Char. |
|---|---|---|---|---|---|
| User 1 | 160-164 | 55-59 | 15-19 | 0.45 | 2 |
| User 2 | 180-184 | 60-64 | 20-24 | 0.58 | 4 |
| User 3 | 175-179 | 55-59 | 25-29 | 0.54 | 3 |

HAPTIC OUTPUT SIGNAL ADJUSTMENT

FIELD OF INVENTION

The present invention relates to an entertainment system, a method and a computer program.

BACKGROUND

In the field of electronic games, it is desirable to provide users with a feeling of immersion during gameplay. That is, when a video game player controls the actions of a virtual character in a virtual environment, the user experience is enhanced if the player is made to feel as if they are experiencing events that occur in the virtual environment from the perspective of the virtual character. Providing effects such as audio and/or haptic feedback which correspond to events occurring in the virtual environment (for example, via a game controller held by the player) is a known method of achieving this. However, it is desirable to further improve a player's experience by enhancing the feeling of immersion felt by the player.

The present invention seeks to alleviate or mitigate this issue.

SUMMARY OF THE INVENTION

In a first aspect, an entertainment system is provided in claim 1.

In another aspect, a method of adjusting a haptic output signal is provided in claim 14.

Further respective aspects and features of the invention are defined in the appended claims.

BRIEF DESCRIPTION OF THE DRAWING

Embodiments of the present invention will now be described by way of example with reference to the accompanying drawings, in which:

FIG. 11 is a table 1100 showing a number of properties of a user 1, a user 2 and a user 3.

DESCRIPTION OF THE EMBODIMENTS

An entertainment system, a method and a computer program are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
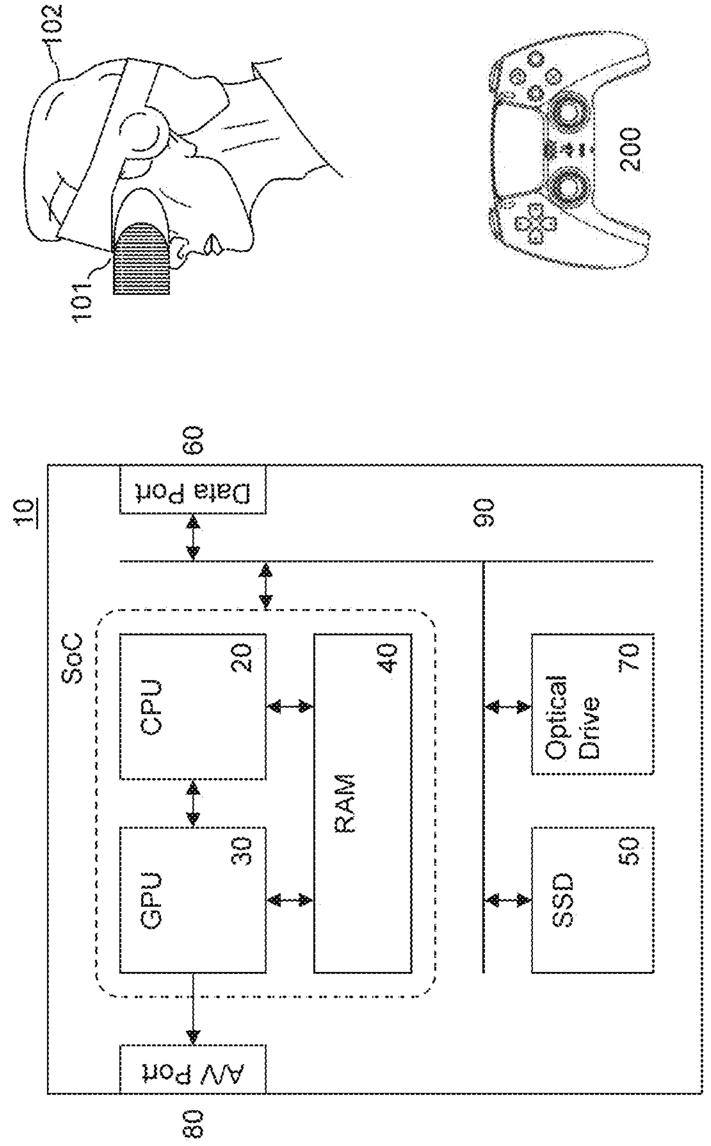
FIG. 1 depicts an entertainment system 10.

Referring to FIG. 1, an entertainment system 10 is depicted. An example of the entertainment system 10 is a computer or console such as the Sony® PlayStation 5 ® (PS5). The entertainment system 10 comprises a central processor 20. This may be a single or multi core processor, for example comprising eight cores as in the PS5. The entertainment system 10 also comprises a graphical processing unit or GPU 30. The GPU can be physically separate to the CPU, or integrated with the CPU as a system on a chip (SoC) as in the PS5.

The entertainment system 10 also comprises RAM 40, and may either have separate RAM for each of the CPU and GPU, or shared RAM as in the PS5. Each RAM can be physically separate, or integrated as part of an SoC as in the PS5. Further storage is provided by a disk 50, either as an external or internal hard drive, or as an external solid state drive, or an internal solid state drive as in the PS5.

The entertainment system 10 may transmit or receive data via one or more data ports 60, such as a USB port, Ethernet® port, WiFi® port, Bluetooth® port or similar, as appropriate. It may also optionally receive data via an optical drive 70. Audio/visual outputs from the entertainment system 10 are typically provided through one or more A/V ports 80, or through one or more of the wired or wireless data ports 60. Where components are not integrated, they may be connected as appropriate either by a dedicated data link or via a bus 90. In embodiments, the entertainment system 10 is configured to output image data to a display. An example of a device configured to display images output by the entertainment system 10 is a head mounted display 'HMD' 101, worn by a user 102. However, any suitable type of display may be used, for example a television screen or the like.

Interaction with the entertainment system 10 is provided via one or more input devices, such as input device 200 and HMD 101. An input device is configured to produce input signals in response to an interaction by a user, and transmit the input signals to the entertainment system 10. The entertainment system 10 comprises circuitry configured to receive the input signals and interpret them according to a predetermined control scheme to cause an interaction with either an operating system of the entertainment system 10 or an application running on it. The entertainment system 10 further comprises circuitry configured to output haptic output signals to the one or more input devices. This will be described in more detail below.

Figure 2:
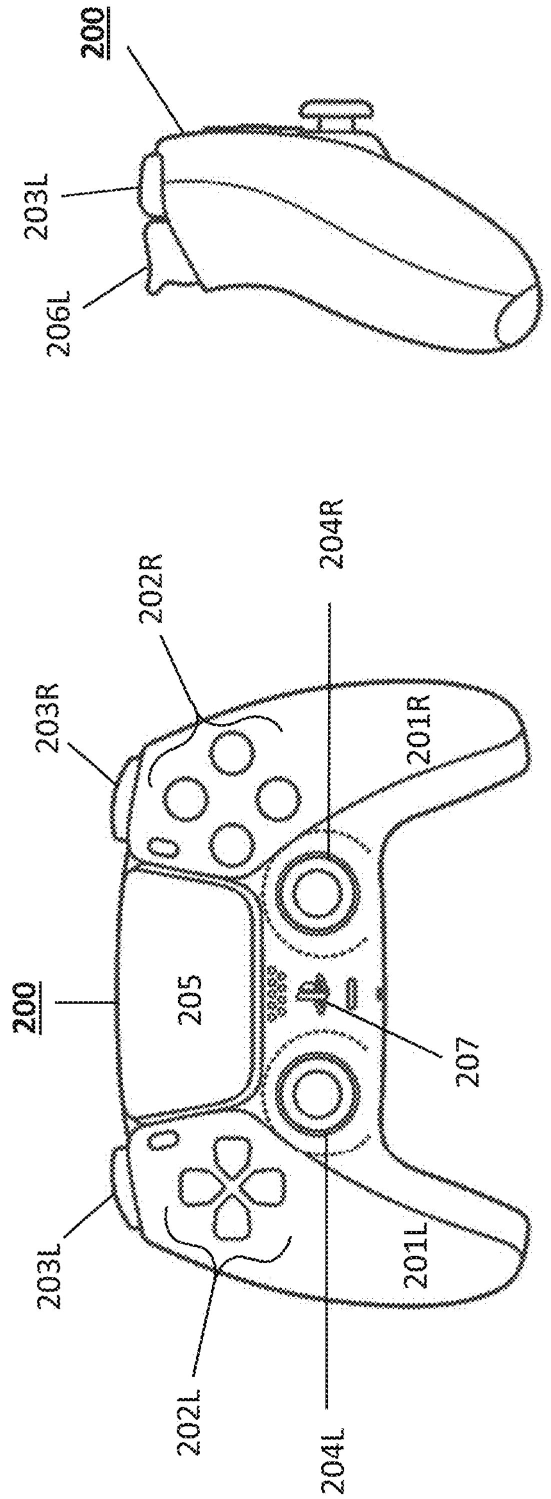
FIG. 2 schematically illustrates an input device 200.
Figure 3:
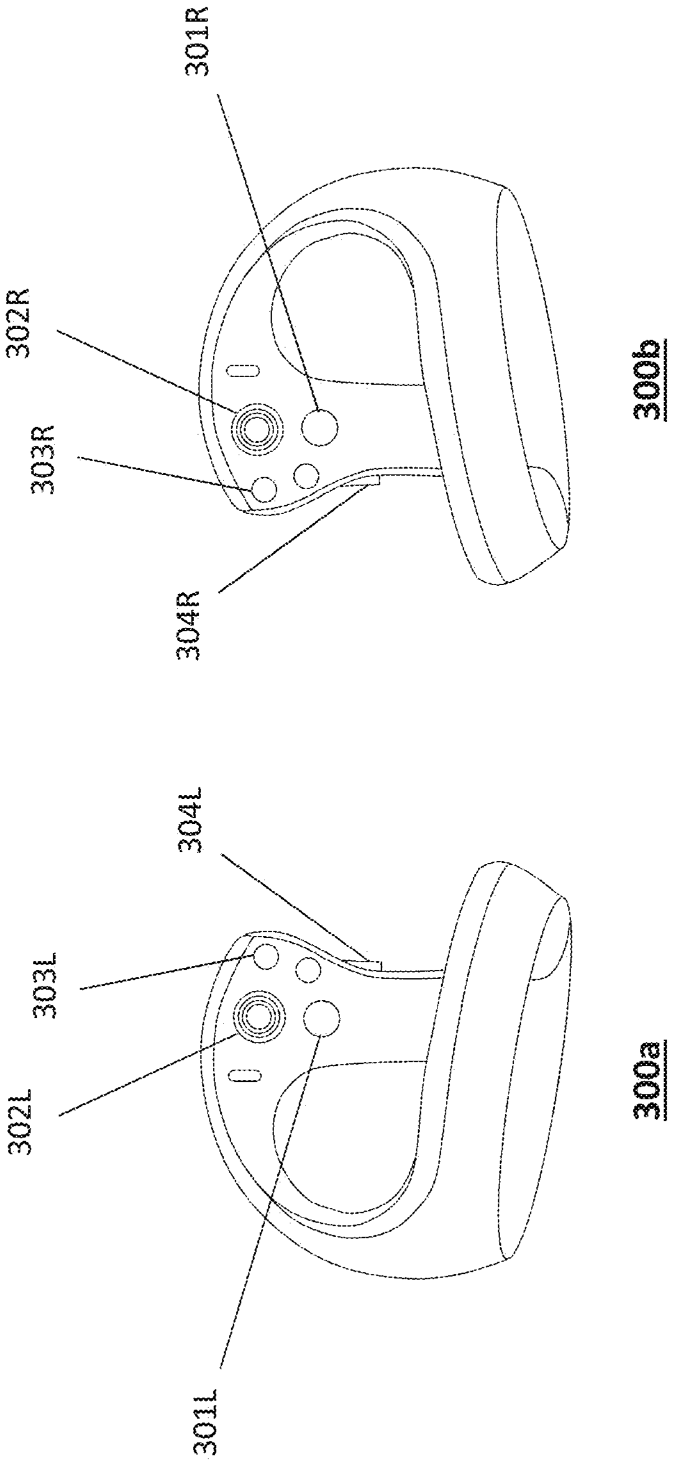
FIG. 3 schematically illustrates input devices 300*a* and 300*b*.

FIGS. 2 and 3 illustrate two types of input device in embodiments. In these embodiments, the entertainment system 10 is the PS5.

FIG. 2 is a schematic diagram of device 200, which is a DualSense® controller, from two perspectives. Handheld controllers such as device 200 typically have two handle sections 201L,R on either side of a central body. Various controls are distributed over such a controller, typically in local groups. Examples include a left button group, which may comprise directional controls, and similarly a right button group, which comprise function controls. Device 200 comprises the left button group 202L and the right button group 202R. A handheld controller may additionally include one or more shoulder buttons 203L,R and also left and/or right joysticks 204L,R which may optionally also be operable as buttons by pressing down on them. Such a controller typically comprises a trigger button on each side of the device, located on the underside. In device 200, each trigger button 206L and 206R (not shown) is positioned directly adjacent to a corresponding shoulder button 203L and 203R.

The device 200 further comprises the system button 207. A handheld controller may comprise one or more system buttons such as 207, typically in the central portion of the device, which cause interaction with an operating system of the entertainment system 10 rather than with a game or other application currently running on it. Such buttons may summon a system menu, allow for recording or sharing of displayed content, or the like. Furthermore, a handheld controller may comprise one or more other elements such as the touchpad 205 seen in FIG. 2, a light for optical tracking (not shown), a screen (not shown), and the like.

FIG. 3 is a schematic diagram of devices 300*a* and 300*b*, which are VR2 Sense® controllers. Devices 300*a* and 300*b* are examples of virtual reality (VR) controllers configured to operate as part of a VR apparatus (such as the PlayStation VR2). A VR apparatus typically comprises one or more handheld controllers and an HMD such as HMD 101 in FIG. 1. Devices 300*a* and 300*b* are configured to be held by a user in the left and right hands respectively, and comprise a number of controls similar to the device 200. These include system buttons 301L and 301R, the left and right joysticks 302L and 302R respectively, the button groups 303L and 303R, and the trigger button 304L and 304R.

However, the present disclosure in not limited in this regard and in further embodiments any suitable type of input device may be used. For example, VR controllers other than the VR2 Sense® controllers may be used which include additional and/or alternative controls. In some embodiments one or more of the input devices may be a mobile phone, a tablet device, a computer, a handheld controller other than a DualSense® controller, or the like. In further embodiments, an input device may be a wearable device such as an HMD. In embodiments where an input device is an HMD, the device may be configured to produce input signals in response to the user interacting with the device by moving their head, moving their eyes, or the like. Such interactions may be detected by the HMD using any suitable technology known in the art, such as eye-tracking cameras, motion sensors or the like. In other embodiments, an input device may be another type of wearable device, for example a glove, a wrist-mounted device or the like.

According to embodiments of the present disclosure, an input device comprises one or more haptic output elements configured to produce haptic output in response to haptic output signals. For example, input devices 200, 300*a* and 300*b* comprise linear resonance actuators (LRAs) which produce haptic output in the form of vibrations in response to haptic output signals. Such haptic output elements may be capable of producing haptic output with different properties, for example different vibration patterns, frequencies, amplitudes or the like. This is discussed in more detail below. The use of LRAs allows properties of the vibrations to be determined with high precision and a broad vibration frequency range to be achieved in comparison to other haptic technology. However, the present disclosure is not limited in this regard and in further embodiments vibration effects may be produced by any suitable type of haptic output element, for example eccentric rotating mass (ERM) actuators or the like.

Input devices 200, 300*a* and 300*b* further provide haptic output in the form of adaptive trigger resistance. When the user interacts with a trigger button (such as 206L,R or 304L,R) the devices are configured to provide a certain amount of resistance (or resistance strength) to the motion of the trigger, wherein the resistance strength can be dynamically adjusted in response to haptic output signals received by the device. This can be achieved with a configuration comprising a DC motor and solenoidal component, for example. However, in further embodiments adaptive trigger resistance may be provided by any suitable means.

Although vibration effects and adaptive trigger resistance have been described above in particular, the present disclosure is not limited in this regard. In further embodiments, any suitable technology known in the art for producing haptic output may be used, for example the use of magnetism, piezoelectric technology, ultrasound, or the like.

As noted above, input signals produced by an input device in response to an interaction by a user are interpreted by the entertainment system 10 to cause an interaction with either an operating system of the entertainment system 10 or an application running on it. In embodiments, an application running on the entertainment system 10 is a video game, and the input signals are interpreted according to a control scheme of the video game.

Figure 4:
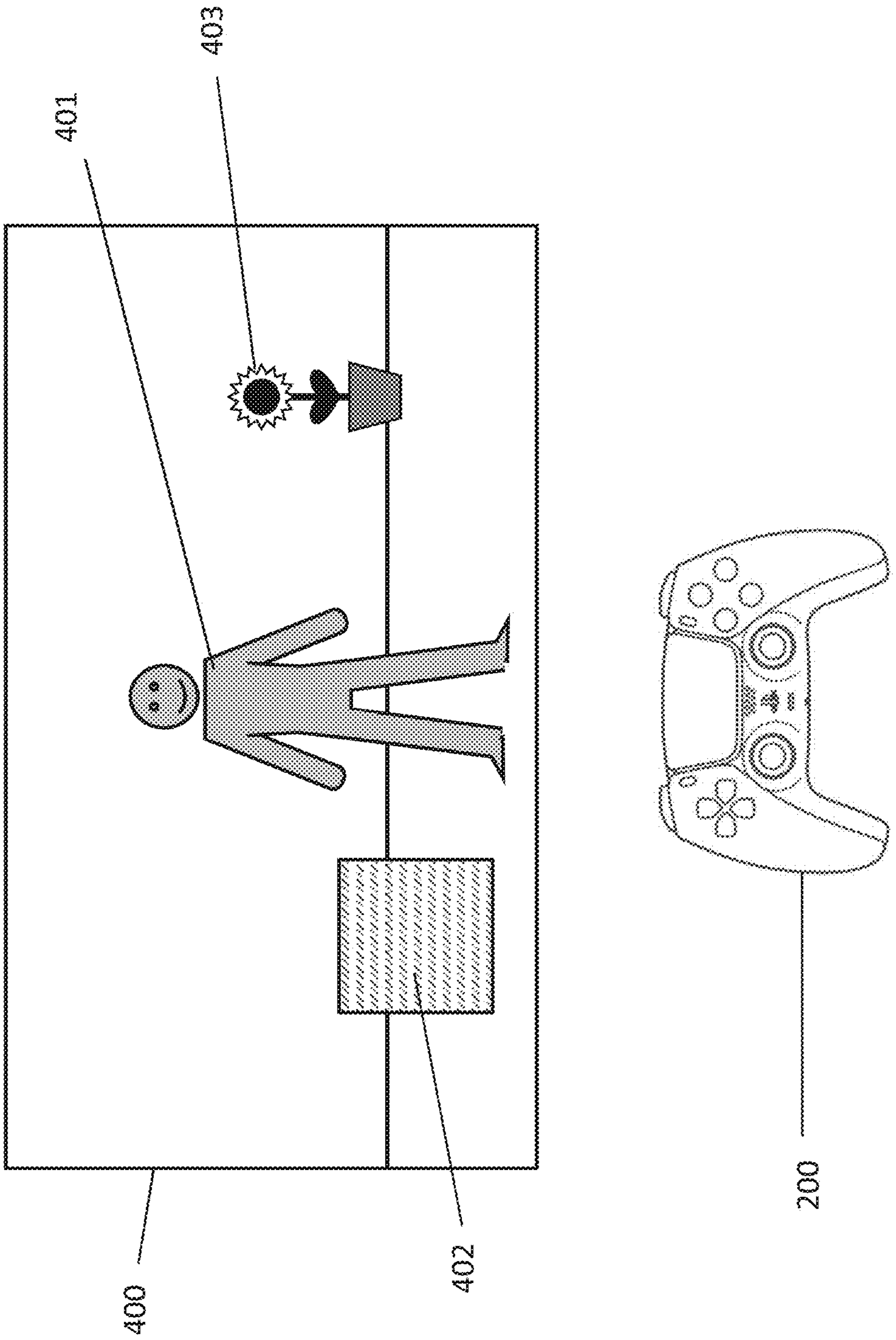
FIG. 4 depicts embodiments in which a user is using the entertainment system 10 to play a video game.

FIG. 4 depicts embodiments in which a user is using an entertainment system 10 to play a video game. Here, the entertainment system 10 comprises the input device 200 and outputs images to a display, which as previously discussed may be any suitable display. Image 400 is an image output by the entertainment system 10, and depicts a virtual character 401 within a virtual environment. The control scheme of the video game is configured such that actions performed by the virtual character 401 within the virtual environment correspond to input signals from the input device 200.

A virtual character may be an entity in the video game that the user can control by interacting with an input device (that is, a 'playable character'). However, in further embodiments a virtual character may be a character which performs one or more actions that are not initiated by the user interacting with the input device (a 'non-playable character'). In these embodiments it may still be desirable to provide the user with the impression of experiencing events that occur in the virtual environment from the perspective of the virtual character, for example. The virtual character may have any suitable appearance, for example a humanoid appearance (such as the virtual character 401), the appearance of an animal, an inanimate object or the like. The virtual environment may comprise any other virtual element than the virtual character, for example background graphics, virtual objects or the like. Virtual objects may be, for example, objects that the virtual character 401 can interact with (as discussed in more detail below), such as object 402. Virtual objects may also comprise objects that the virtual character 401 cannot interact with, such as the background object 403.

In FIG. 4, image 400 depicts the virtual character 401 within the virtual environment from an outside (third-person) perspective. However, the present disclosure is not limited in this regard and in other embodiments the images displayed to the user may depict the virtual environment from the perspective of the virtual character 401 (that is, from a first-person perspective). Furthermore, the video game may be configured such that the virtual character 401 and/or the virtual environment are depicted in a two-dimensional (2D) form or a three-dimensional (3D) form.

Actions performed by the virtual character 401 within the virtual environment may include actions such as walking, jumping, performing a fighting action (such as a punch or kick) or the like. Some actions performed by the virtual character 401 may involve interacting with one or more virtual objects in the virtual environment. For example, in some embodiments the virtual character is able to interact with an object (such as another virtual character) by punching or otherwise attacking it, either directly or with the use of a weapon. In further embodiments, interactions with virtual objects comprises picking up and manipulating an object (e.g. picking up a book and opening it, picking up a weapon and equipping it to use, throwing a grenade or the like), attaching an object to the virtual character (e.g. putting on an item of clothing), or moving a object (e.g. pushing a crate, kicking a football or the like). The virtual character 401 may traverse an obstacle by climbing or jumping over a virtual object in further embodiments. In addition to the examples described here, the virtual character may interact with the virtual environment in any suitable manner known in the art. For example, in some embodiments the virtual character may interact with parts of the virtual environment other than virtual objects (e.g. interacting with the 'ground' by falling from a height and impacting it).

In some embodiments an interaction with a virtual character may be initiated directly by the user, by controlling the virtual character to perform a particular action. For example, pressing one of the controls 202L may correspond to a 'jump' action that the virtual character can perform at any time. In another example, another one of the controls 202L may correspond to a 'pick up' action that the virtual character can only perform in certain circumstances (e.g. if it is located within a predetermined distance from a virtual object which can be picked up). In further embodiments, an interaction may occur without a direct input by the user. For example, a virtual object may fall on the virtual character and impact it if the character moves into a particular area, or the virtual character may automatically drop an object after the character has been holding it for a predetermined time. In another example, an interaction may occur during a predetermined section of the videogame during which the user has limited or no control over the actions of the virtual character (such as during a cutscene).

When a virtual character interacts with a virtual environment, it is desirable to make the interaction feel 'realistic' to a user. This can be achieved by enabling the user to imagine what such an interaction would feel like from the perspective of the virtual character, for example by simulating a sensation that is associated with the interaction. The associated sensation is the sensation that a real person would be expected to feel if they were to perform such an interaction: for example, if a real person were to pick up a heavy object, they would feel a force due to the weight of the object. When a virtual character is shown picking up a virtual object in a video game, an associated sensation therefore comprises what a viewer would expect the weight of such an object to feel like from the perspective of the virtual character. This is discussed in more detail below.

A known method of enabling interactions in video games to feel more realistic in this way is the use of haptic feedback. Video games are often configured to generate haptic output signals that correspond to a state of a virtual environment, such that when a certain interaction between a virtual character and the virtual environment occurs, a corresponding haptic output signal is produced. The one or more input devices that the user is using to play the game therefore produce corresponding haptic output when the interaction occurs, to simulate a sensation associated with the interaction.

Figure 5:
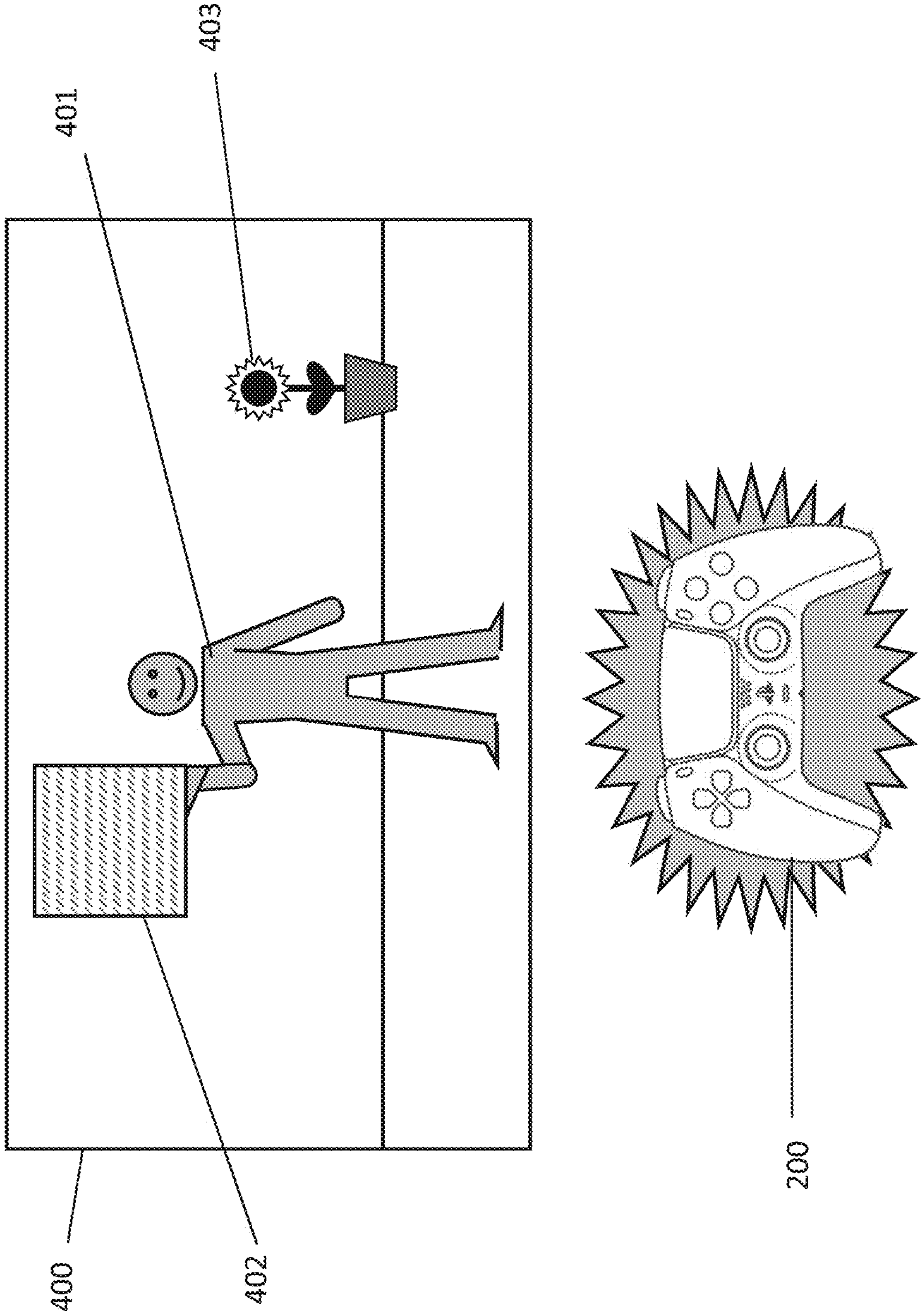
FIG. 5 shows a virtual character 401 picking up a virtual object 402 in a video game.

An example of this is depicted in FIG. 5. In FIG. 5, the virtual character 401 is shown picking up the virtual object 402. The video game is configured such that, in response to this action, a corresponding haptic output signal is generated which the entertainment system outputs to the input device 200. The haptic output elements included in input device 200 then produce vibrations in response to the haptic output signal, and the vibrations produced simulate the feeling of the weight of the object 402.

Haptic output signals may be generated which correspond to any interaction with the virtual environment that is associated with a sensation felt by the virtual character. For example, some interactions may involve supporting a virtual object. Such interactions comprise interacting with a virtual object in such a way that an associated sensation comprises feeling the weight of an object. For example, picking up a virtual object, as shown in FIG. 5, wearing a virtual object (e.g. a hat), being crushed by a virtual object that has fallen onto the virtual character, or the like. In further embodiments, the interaction comprises an impact between the virtual character and an element in the virtual environment, and the associated sensation comprises the feeling of being struck by an impact force. Such interactions include, for example, interactions in which the virtual character impacts the ground after falling from a height, impacts a virtual object when punching it, is struck by an object such as a projectile, or the like. Further examples of interactions between a virtual character and a virtual environment include moving through grass or wading through water (wherein the associated sensation comprises a resistance to the character's movement), firing a gun (wherein the associated sensation comprises a recoil force) or the like.

The haptic output produced by an input device such as input device 200 may have a number of different properties, as discussed above. For example, vibrations may have different patterns, frequencies or amplitudes, and trigger resistance may have different resistance strengths. Haptic output with different properties can be used to simulate different sensations. For example, a series of intense (high-amplitude) vibrations with a short duration may be used to simulate the feeling of being struck by a projectile, whereas a series of less intense (lower-amplitude) vibrations over a longer time period may be used to simulate the feeling of carrying an object. When the virtual character pulls a bowstring the associated sensation may be simulated using trigger resistance, whilst when a virtual character wades through water the associated sensation may be simulated using vibrations. Both the type and properties of the haptic output produced by an input device are determined based on the properties of the haptic output signals received from the entertainment system 10.

By using haptic output with different properties, different sensations can therefore be simulated that are specific to the associated interaction with the virtual environment. The variety in the haptic output improves the experience of a user playing a video game by making the actions performed by the virtual character feel more 'real'. In embodiments of the present disclosure, this effect is further improved by adjusting haptic output properties based on a characteristic of the virtual character as well as a characteristic of the interaction.

When an action is performed by a real person, a person who is physically strong may feel a different sensation to a person who is physically weaker. For example, when a strong person picks up an object, they feel less resistance to the action of lifting the object that when a weaker person picks up the same object: the same weight feels lighter to a stronger person and heavier to a weaker person. A user will therefore expect a particular interaction to feel different from the perspective of one virtual character than from the perspective of another virtual character, depending on how 'strong' the user perceives the character to be. That is, when a virtual character interacts with a virtual environment in such a way that the associated sensation includes feeling a force (such as the weight of an object), a user will expect the force to feel weaker (e.g. an object to feel lighter) when the virtual character is perceived to be 'strong'. Similarly, the user will expect the force to feel stronger (e.g. an object to feel heavier) when the virtual character is perceived to be 'weak'.

As a result, the entertainment system 10 can provide the user with a more realistic experience by simulating a different sensation (e.g. a weaker or stronger force) associated with a particular interaction depending on a characteristic of the virtual character, where the characteristic of the virtual character indicates how 'strong' the user expects the character to be. This characteristic is referred to herein as a strength characteristic of the virtual character.

Figure 6:
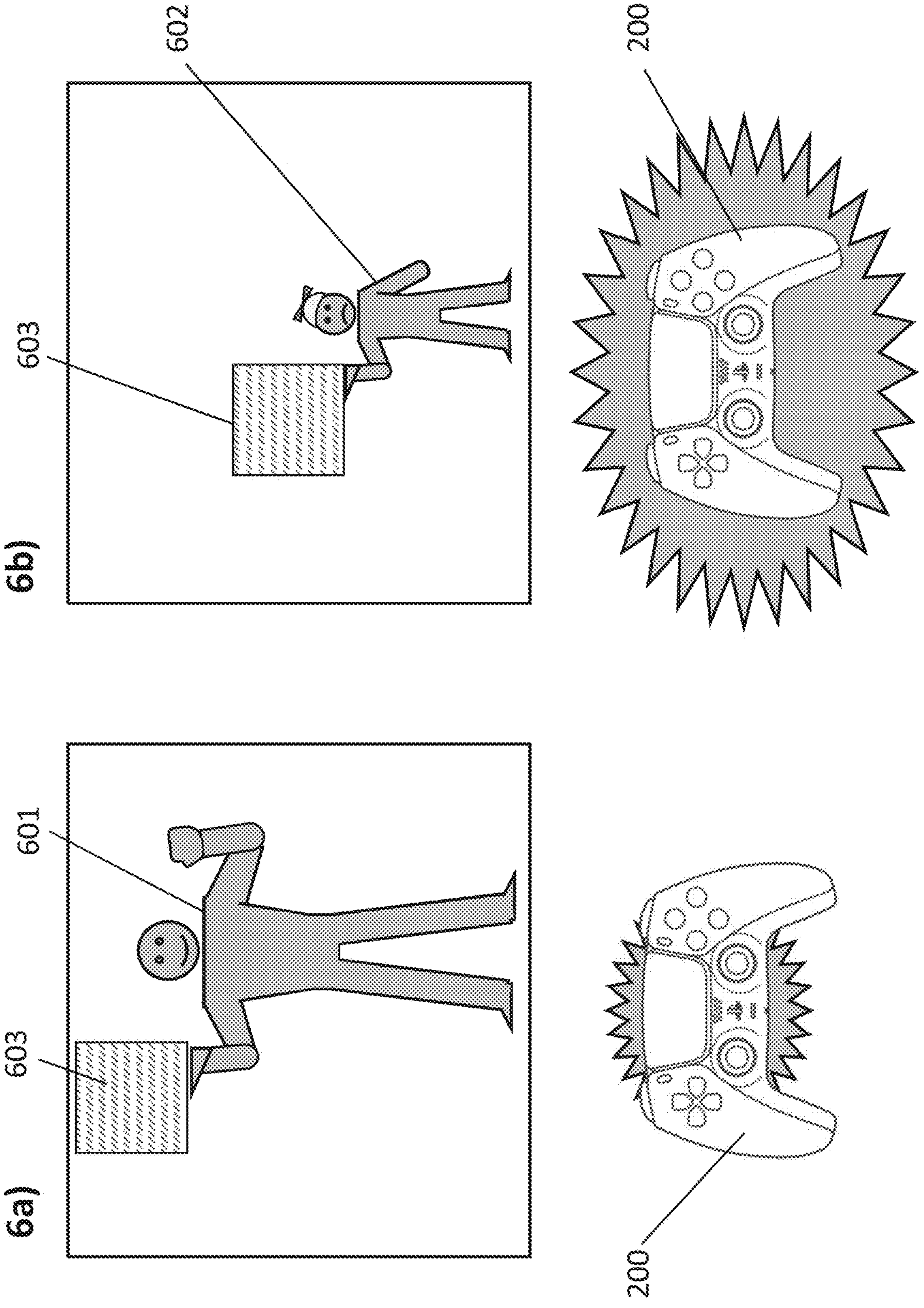
FIGS. 6*a*) and 6*b*) depict two scenarios in which virtual characters with different strength characteristics interact with a virtual environment in a video game.

FIGS. 6*a*) and 6*b*) depict two scenarios in which virtual characters with different strength characteristics interact with a virtual environment in a video game. In each scenario, a user is using input device 200 to control the virtual character 601/602. In FIG. 6*a*), the virtual character 601 is shown picking up a virtual object 603, whilst in FIG. 6*b*) the virtual character 602 is shown picking up the same virtual object 603. When the virtual character 601/602 picks up the object 603 in each scenario, the video game is configured such that a corresponding haptic output signal is generated in response. Having obtained the haptic output signal, the entertainment system 10 performs a determination process to determine a strength characteristic of the virtual character. This is discussed in more detail below.

The entertainment system 10 is further configured to determine a haptic adjustment property based on the strength characteristic. A haptic adjustment property corresponds to a change in one or more properties of the haptic output produced by an input device. For example, a haptic adjustment property may be a change in the vibration pattern or strength of a vibration produced by the input device 200. The entertainment system 10 then performs processing to adjust the obtained haptic output signal according to the haptic adjustment property. That is, the system 10 adjusts one or more properties of the haptic output signal to produce an adjusted haptic output signal. The adjusted haptic output signal is then output to the input device, which produces haptic output according to the adjusted haptic output signal.

In the embodiments depicted in FIGS. 6*a* and 6*b*, the haptic output signal obtained by the entertainment system 10 corresponds to producing haptic output in the form of vibrations. The entertainment system 10 determines a strength characteristic of the virtual characters 601 and 602, and in each scenario determines a different haptic adjustment property based on the strength characteristic. In the scenario of FIG. 6*a*), the determined strength characteristic of 601 is high (that is, it indicates that the character 601 is 'strong'). In response, the entertainment system 10 selects a haptic adjustment property which corresponds to a decrease in vibration strength, and adjusts the obtained haptic output signal accordingly to produce a first adjusted haptic output signal. In the scenario of FIG. 6*b*), 602 is determined to have a low strength characteristic (indicating that the character 602 is 'weak'), and the entertainment system 10 selects a haptic adjustment property which corresponds to an increase in vibration strength. The obtained haptic output signal is then adjusted accordingly to produce a second adjusted haptic output signal. In the scenario of FIG. 6*a*), the input device 200 therefore produces haptic output in the form of vibrations with low vibration strength in response to receiving the first adjusted haptic output signal. In FIG. 6*b*), the input device 200 produces haptic output in the form of vibrations with high vibration strength in response to receiving the second adjusted haptic output signal.

The input device 200 therefore produces haptic output with different properties when a 'strong' virtual character picks up the object than when a 'weak' virtual character picks up an object. Such haptic output with different properties simulate different sensations, in this case a weaker or stronger force associated with picking up an object, depending on a strength characteristic of the virtual character.

In the embodiments depicted in FIGS. 6*a*) and 6*b*), stronger vibrations (that is, vibrations with higher amplitude) are used to simulate a stronger force whilst weaker vibrations (vibrations with lower amplitude) are used to simulate a weaker force. However, the present disclosure is not limited in this regard and in further embodiments the haptic output signal may be adjusted in any suitable manner to simulate a stronger or weaker force felt by a virtual character. For example, when the entertainment system 10 determines a low strength characteristic of a virtual character, the system 10 may select a haptic adjustment property which corresponds to an increase in trigger resistance strength (or other controller resistance strength, where provided), higher frequency vibrations, a different vibration pattern, a longer duration for which vibrations are output, or the like. In contrast, when the entertainment system 10 determines a high strength characteristic of a virtual character, the system 10 may select a haptic adjustment property which corresponds to a decrease in trigger resistance strength, low frequency vibrations, a different vibration pattern, a shorter duration for which vibrations are output, or the like.

The strength characteristic of a virtual character may be determined by the system 10 based on information received from an application running on the system 10 which includes the virtual character (e.g. the video game which includes the virtual character). For example, the video game may allocate a particular strength characteristic to a particular virtual character. In another example, information indicating a status of the character in the video game may be used to determine the strength characteristic (e.g. a low strength characteristic may be determined when the character has a low amount of 'health' remaining, or is sick, tired, or the like). In further embodiments, aspects of a character's appearance such as its relative size, shape, apparent age or the like may be used by the system 10 to determine the strength characteristic. In FIGS. 6*a*) and 6*b*) for example, character 601 has the appearance of a person who is physically strong whilst 602 has the appearance of a small child. It may therefore be determined by the video game and/or the system 10 that 601 has a high strength characteristic and 602 has a low strength characteristic.

Figure 7:
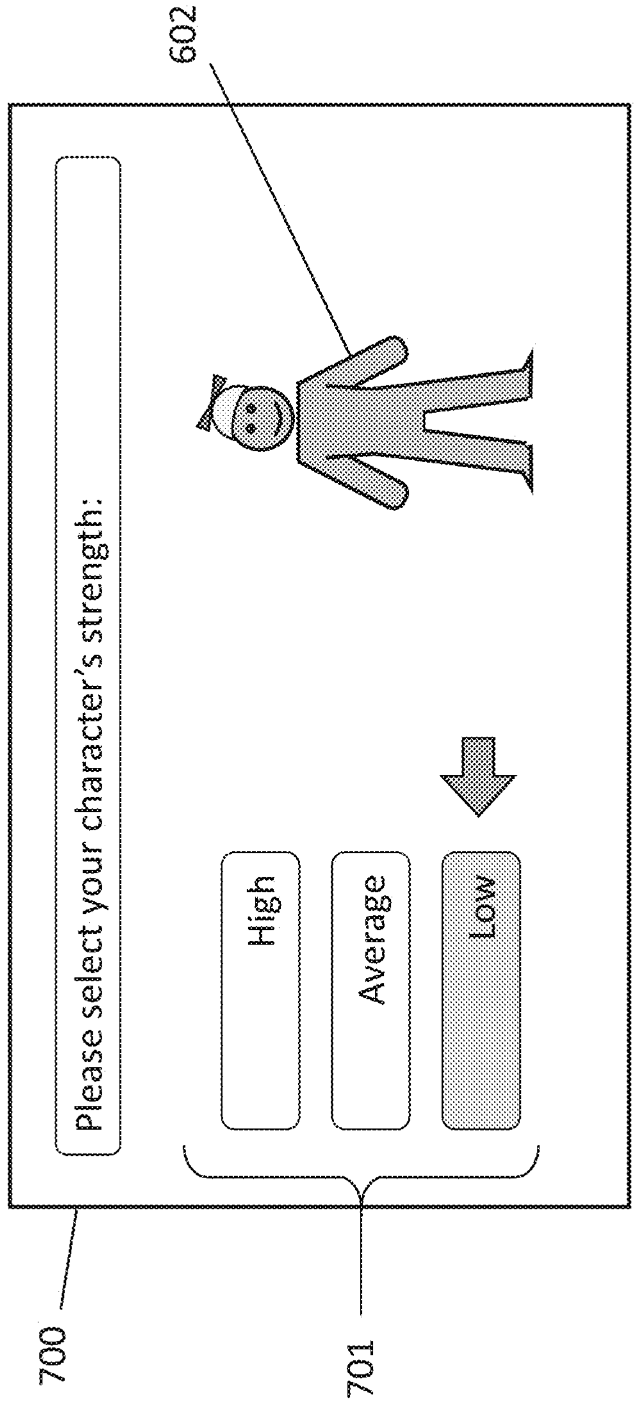
FIG. 7 depicts a user interface that allows a user to select a strength characteristic for a particular virtual character.

In further embodiments, the entertainment system 10 determines the strength characteristic of a virtual character based on an input from a user. For example, the system 10 may be configured to display an interface to the user that allows the user to select a strength characteristic for a particular virtual character. This is depicted in FIG. 7. In FIG. 7, the interface 700 includes an image of the virtual character 602, and a series of strength characteristic options 701 from which the user can select the appropriate strength characteristic for the virtual character. However, the present disclosure is not limited in this regard and in further embodiments the interface 700 may take any suitable form that allows the user to indicate a strength characteristic associated with a particular character. For example, in other embodiments the virtual character 602 may be indicated by a name of the character rather than an image of the character. The strength characteristic options 701 may express the strength characteristic in any suitable form (e.g. a numerical value on a scale). This is discussed in more detail below.

In some embodiments, the user may be provided with a demonstration of haptic output which may be produced when a character is a particular strength to assist in their decision. For example, when the option 'Low' is selected by the user, the system 10 may be configured to produce a haptic output signal (e.g. a vibration), determine a haptic adjustment property corresponding to a strength characteristic that is 'Low' (e.g. an increase in vibration strength), adjust the haptic output signal accordingly and output the adjusted signal to the user's input device.

The strength characteristic of a virtual character may be determined by the system 10 before or after receiving the haptic output signal. For example, in some embodiments the system 10 may determine the strength characteristic of a virtual character in a video game when the game is started (e.g. by asking a user to select a strength characteristic for a particular character), and record this on a suitable storage medium included in the entertainment system (e.g. the RAM 40 or the disk 50 depicted in FIG. 1, or the like). However, the disclosure is not limited in this regard and in further embodiments the system 10 may record the strength characteristic in any suitable manner, for example by sending it to any suitable storage medium in an external device, a remote server or the like. When a haptic output signal is obtained, the system then retrieves the stored strength characteristic from where it is stored. In other embodiments, the system 10 may determine the strength characteristic in response to obtaining the haptic output signal (e.g. by receiving information from the video game indicating a strength characteristic of the character at that time).

The strength characteristic of a virtual may, in some embodiments, be expressed as a numerical value that falls on a continuous scale (e.g. a scale of 1 to 10, where 1 represents a 'weak' character and 10 represents a 'strong' character, and the strength characteristic may fall anywhere on the scale). Here, the haptic output adjustment property may correspond to a continuous change in a haptic output property that is proportional to the strength characteristic. For example, a change in vibration strength than ranges from a maximum decrease in vibration strength to a maximum increase in vibration strength. In other embodiments, the strength characteristic is expressed as a numerical value that falls on a discontinuous scale comprising a number of discrete categories (e.g. a scale of 1 to 5 where the strength characteristic may be either 1, 2, 3, 4 or 5). Here, the haptic output adjustment property may be selected from a number of discrete options that each correspond to a particular strength characteristic. For example, there may be five predetermined categories of change in vibration strength, where the strength characteristics of 1, 2, 3, 4 and 5 correspond to a high decrease in vibration strength, a low decrease in vibration strength, no change in vibration strength, a low increase in vibration strength, and a high increase in vibration strength respectively.

However, the present disclosure is not limited in this regard and in further embodiments a strength characteristic may be expressed in any suitable form, and a haptic output adjustment property may be determined according to a strength characteristic in any suitable manner. In some embodiments for example, the strength characteristic of a virtual character is expressed as a discrete option with no corresponding numerical value (e.g. simply 'weak', 'average' and 'strong'), where each option corresponds to a particular haptic adjustment property accordingly.

In some embodiments, the system 10 determines the haptic adjustment property based on the strength characteristic of the virtual character by retrieving information which has been previously stored. For example, the system may access a database in which certain strength characteristics are stored in association with haptic adjustment properties, such that the system can identify the haptic adjustment property that is associated with the determined strength characteristic. The database may be recorded on any suitable storage medium included in the entertainment system, any suitable storage medium in an external device, a remote server or the like. However, the present disclosure is not limited in this regard and in other embodiments the system may determine the haptic adjustment property based on the strength characteristic by any suitable means.

The system 10 may be configured to determine the haptic adjustment property based on the obtained haptic output signal as well as the determined strength characteristic. In some embodiments for example, the system 10 is configured to identify a first haptic output property that is indicated by the haptic output signal it has obtained, identify a second haptic output property that corresponds to the determined strength characteristic of the virtual character, and calculate the change in haptic output property required for the adjusted haptic output signal to correspond to the second haptic output property. For example, if an obtained haptic output signal indicates that the input device will produce a vibration for two seconds (the first haptic output property) and the system 10 determines a strength characteristic of a virtual character expressed as a value of 1 (out of a range of 1 to 5), the system may be configured to associate a strength characteristic of 4 with a second haptic output property that comprises producing a vibration for four seconds. The system 10 then determines a haptic adjustment property which corresponds to an increase in the duration of the vibration by two seconds. When the system performs processing to adjust the haptic output signal according to the haptic adjustment property, the adjusted haptic output signal therefore corresponds to producing a vibration for four seconds.

Another way to ensure that the haptic output produced in response to a virtual character interacting with a virtual environment feels more 'realistic' to a user is by causing the 'strength' of the character to reflect the strength of the user. That is, by providing a strong user with haptic output that simulates a sensation felt by a strong character, and providing a weaker user with haptic output that simulates a sensation felt by a weaker character. In some embodiments of the invention, the entertainment system 10 therefore determines the strength characteristic of a virtual character based on one or more properties of a user.

Figure 8:
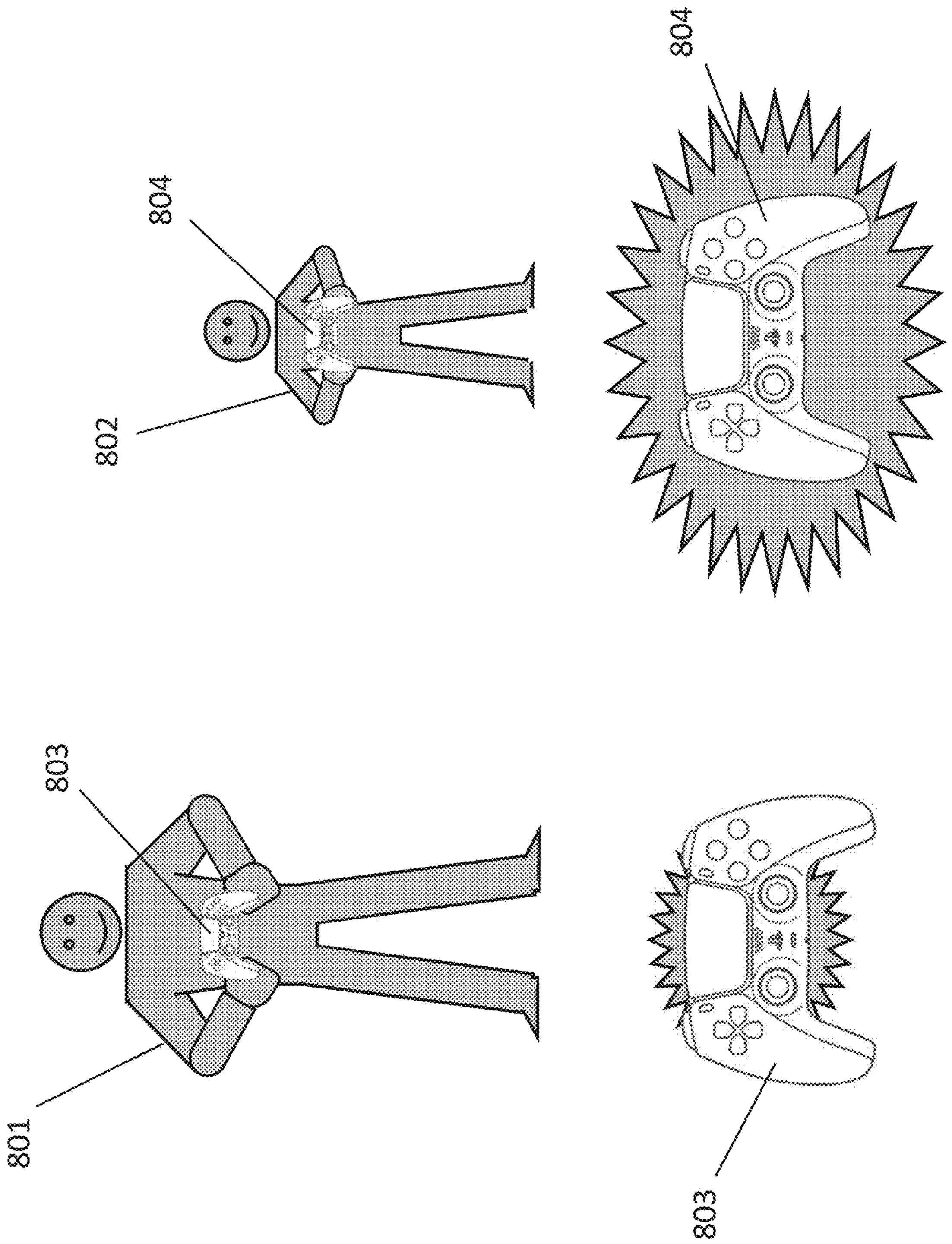
FIG. 8 depicts a stronger user 801 using an input device 803 and a weaker user 802 using an input device 804.

FIG. 8 depicts a stronger user 801 and a weaker user 802 (where 802 is a small child, for example). In these embodiments, user 801 is using an input device 803 to control the actions of a first virtual character in a virtual environment (not shown), and user 802 is using an input device 804 to control the actions of a second virtual character in a virtual environment (not shown). The two users may be playing the same video game, or different games. FIG. 8 also depicts the input devices 803 and 804 producing haptic output with different properties.

In these embodiments, the system 10 determines that the first virtual character has a high strength characteristic based on properties of the user 801, and determines that the second virtual character has a low strength characteristic based on properties of the user 802. The system 10 therefore determines different haptic adjustment properties for each virtual character, based on the different strength characteristics, when a haptic output signal is received. For example, if user 801 causes the first virtual character to pick up a virtual object and a haptic output signal corresponding to a vibration is produced in response, the system 10 may determine the first virtual character to have a high strength characteristic based on properties of the user 801, and select a haptic adjustment property which corresponds to a decrease in vibration strength. The input device 803 therefore produces weaker vibrations, simulating a sensation felt by a stronger character. In contrast, if user 802 causes the second virtual character to pick up an identical virtual object, the system 10 may determine a low strength characteristic for the second virtual character based on properties of the user 802, and select a haptic adjustment property corresponding to an increase in vibration strength. The input device 804 produces stronger vibrations, simulating a sensation felt by a weaker character.

Properties of a user that the system 10 may use to determine the strength characteristic of a character include the user's height, weight, age, BMI, or the like. This information may be provided by the user. For example, the system 10 may be configured to display an interface to the user that allows the user to input a number of properties. This is depicted in FIG. 9.

Figure 9:
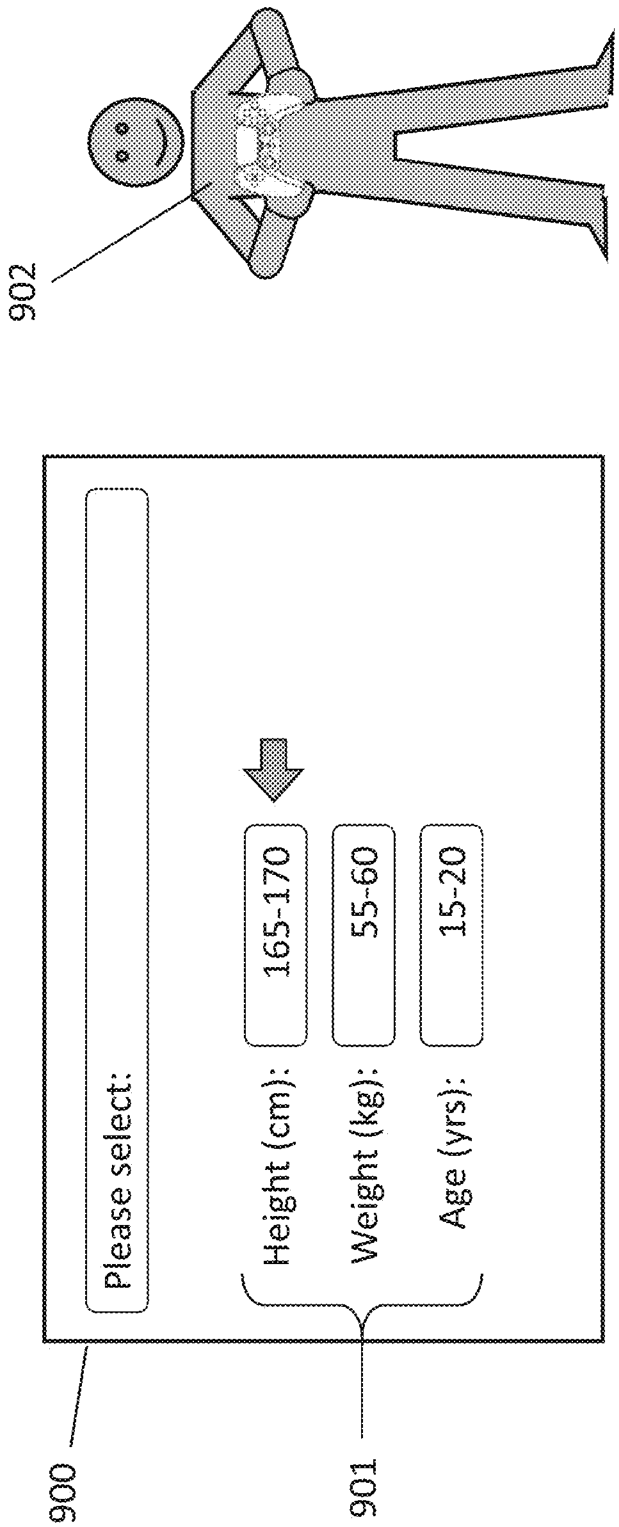
FIG. 9 shows a user interface that allows a user to input a number of properties.

FIG. 9 shows an interface 900 comprising three options 901 that is being displayed to a user 902. In these embodiments, each of the options 901 comprises a drop-down menu (not shown) from which the user 902 can select an appropriate range of properties. For example, the user 902 may select the height range of 165-170 if their height falls within this range. However, the present disclosure is not limited in this regard and in further embodiments the interface 900 may take any suitable form which allows one or more properties to be input by a user. For example, the options 901 may allow the user 902 to type in their height, weight and age directly, to indicate where their height, weight and age falls on a linear scale, or the like. The options 901 may additionally or alternatively comprise other properties (e.g. BMI) that the user may indicate.

In further embodiments, the entertainment system 10 may determine properties of a user in any suitable manner known in the art. For example, the system 10 may obtain certain properties of a user from an external device, such as a fitness device worn by the user, a mobile phone, a computer or the like. In another example, the system 10 may be configured to prompt the user to perform a physical task, and determine a property of the user based on how successfully they performed the task (e.g. the user may be requested to press and hold down a trigger button, and the system identifies how long the user was able to hold down the button when a particular trigger resistance is applied).

Figure 10:
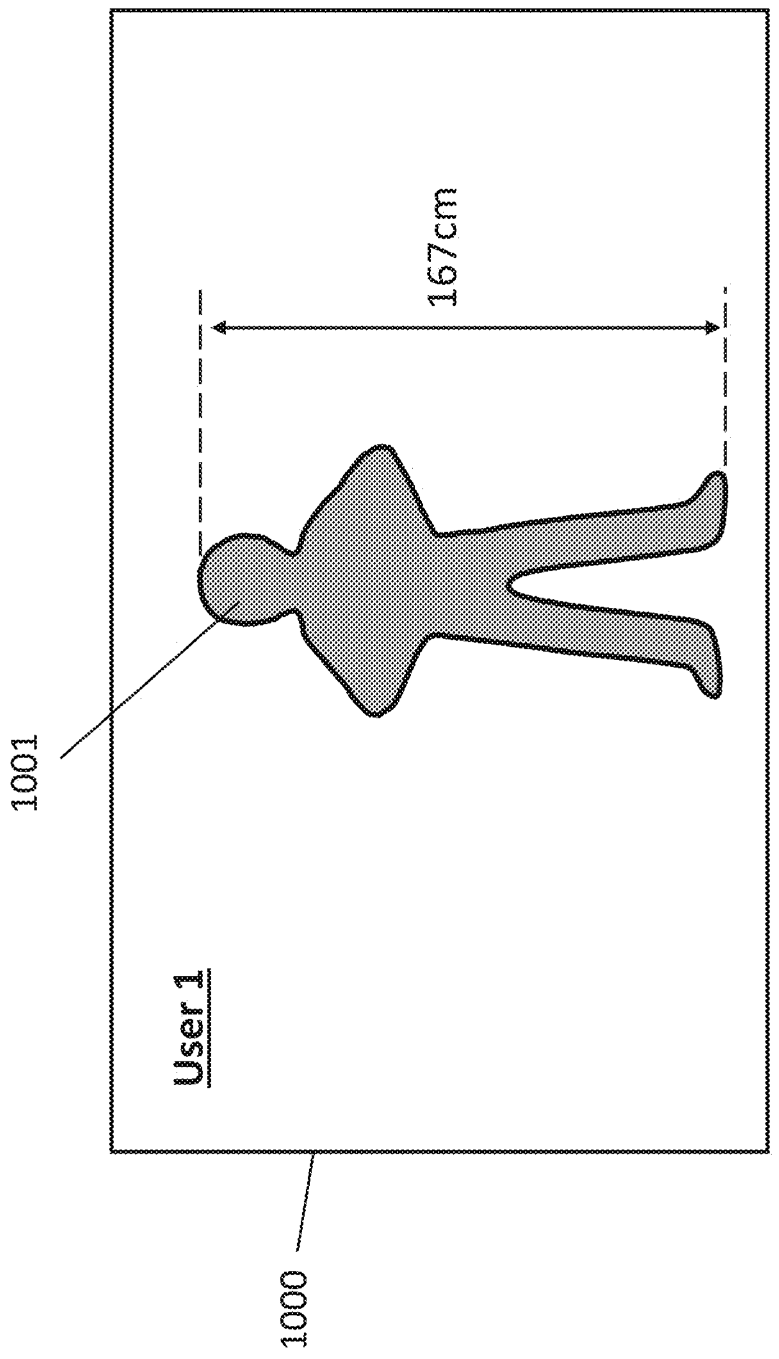
FIG. 10 depicts embodiments where the system 10 performs processing on an image 1000 of a user to determine an approximate shape 1001 of the user

In some embodiments, the system 10 determines properties of a user by performing image processing on one or more images captured of the user. The entertainment system 10 may receive the one or more images from an external device, or comprise an image-capturing device itself that is configured to capture images of the user, for example. The system 10 then performs processing to identify the user in the image, and determine a property of the user based on their appearance. FIG. 10 shows an example where the system 10 performs object-recognition processing on an image 1000 of a user to determine an approximate shape 1001 (or silhouette) of the user, using any suitable object-recognition technique known in the art. If the height of the user is known (e.g. if the user inputs their height), the area of the silhouette 1001 may then be calculated in real space. This silhouette area can then be used to determine an appropriate strength characteristic, as described below.

FIG. 11 is a table 1100 showing a number of properties of a user 1, a user 2 and a user 3 which are used to determine strength characteristic values in embodiments of the present disclosure. For each user, properties in the table include the user's height, weight, age, and silhouette area, alongside the strength characteristic that is associated with the user. The strength characteristic may be determined based on the values of the properties in the table in any appropriate manner. For example, in embodiments where the properties can each be classified into discrete categories (e.g. a height of 175-179 cm) the entertainment system may have access to a database containing all possible combinations of each category for each property, each combination being associated with a particular strength characteristic. The system 10 may therefore determine the strength characteristic for a particular user by identifying which strength characteristic is associated with the particular combination of properties the user possesses. In other embodiments however, the system may calculate a strength characteristic by associating a particular height (or range of heights), weight (or range of weights) or the like with a particular strength characteristic.

Optionally, the strength characteristic referred to may be for the purposes of haptic feedback only; that is to say, the effective strength of the virtual character (for the purposes of in-environment interaction) can be partially or fully decoupled from the strength indicated through haptic feedback. This may be necessary for example to enable game progress in a single player game (for example where an obstruction must be moved) or equal capability in a multiplayer game where a strength disparity would advantage one party. Hence the strength characteristic used to adjust the haptic signal may be separate (decoupled) from another strength value used for in-environment interactions, or may combine/be averaged (partially decoupled) from another strength value used for in-environment interactions so as to act as a modifier of that other value for the purposes of haptic feedback. Hence for example for two different users the character's interaction strength can be the same (or limited in once case to a minimum needed to progress), but the haptic effect for the different users having different haptic strength characteristics is different. This approach allows for the subjective impression of strength to differ for different users, for example, whilst in-environment strength or similar capability values of the user's character can change separately as progress is made within the environment.

Figure 12:
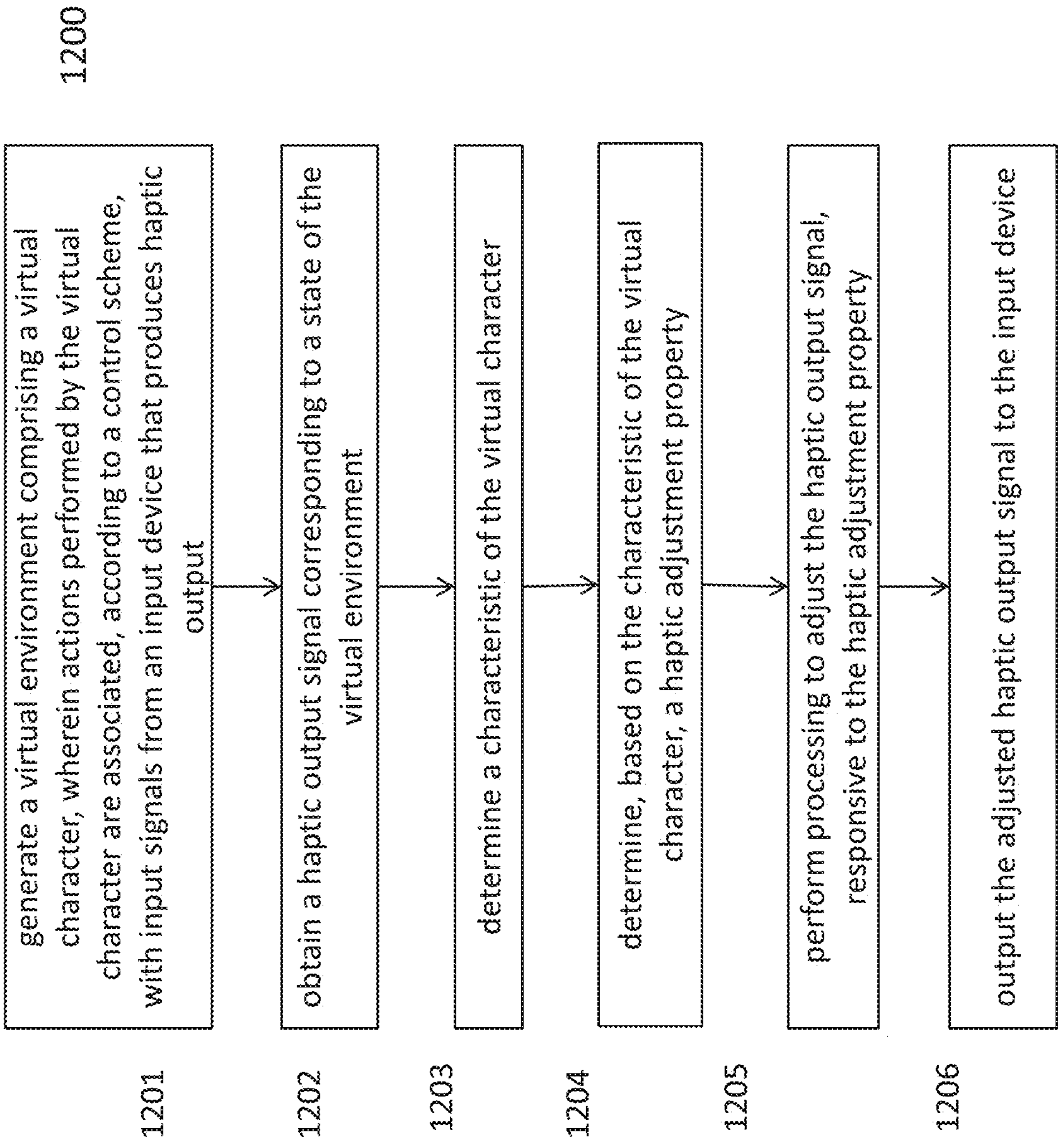
FIG. 12 is a flowchart of a method 1200 for adjusting a haptic output signal.

FIG. 12 is a flowchart of a method 1200 for adjusting a haptic output signal according to embodiments of the present disclosure, comprising the following steps. In step 1201, a virtual environment comprising a virtual character is generated (e.g. the virtual characters 601 or 602 in FIGS. 6*a*) and 6*b*)). In step 1202, a haptic output signal corresponding to a state of the virtual environment is obtained. In step 1203, a characteristic of the virtual character is determined (e.g. a strength characteristic indicating the character 601 is 'strong' or the character 603 is 'weak'). In step 1204, a haptic adjustment property is determined based on the characteristic of the virtual character (e.g. a haptic adjustment property corresponding to an increase or decrease in vibration strength). In step 1205, processing is performed to adjust the haptic output signal, responsive to the haptic adjustment property (e.g. to adjust the haptic output signal such that it corresponds to a vibration with increased or decreased strength). In step 1206, the adjusted haptic output signal is output to an input device (e.g. device 200 or devices 300*a* and 300*b*) that produces haptic output, wherein actions performed by the virtual character are associated with input signals from an input device according to a control scheme.

It will be apparent to a person skilled in the art that variations in the above method corresponding to operation of the various embodiments of the apparatus as described and claimed herein are considered within the scope of the present invention.

It will be appreciated that the above methods may be carried out on conventional hardware (such as entertainment system 10) suitably adapted as applicable by software instruction or by the inclusion or substitution of dedicated hardware. Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

In a summary embodiment of the present description, an entertainment system comprises: circuitry configured to generate a virtual environment comprising a virtual character, wherein actions performed by the virtual character are associated, according to a control scheme, with input signals from an input device operable to produce a haptic output, obtain a haptic output signal corresponding to a state of the virtual environment, determine a characteristic of the virtual character, determine, based on the characteristic of the virtual character, a haptic adjustment property, perform processing to adjust the haptic output signal, responsive to the haptic adjustment property, and output the adjusted haptic output signal to the input device.

It will be apparent to a person skilled in the art that variations in the above system corresponding to operation of the various embodiments as described and claimed herein are considered within the scope of the present invention, including but not limited to that:

- the state of the virtual environment that corresponds to the haptic output signal may comprise an interaction with the virtual character in the virtual environment, as described elsewhere herein;
- the interaction comprises supporting a virtual object, as described elsewhere herein;
- the characteristic of the virtual character may comprise a strength characteristic associated with the virtual character, as described elsewhere herein;
- the characteristic of the virtual character may be determined based on information received from an application running on the entertainment system, as described elsewhere herein;
- the characteristic of the virtual character may be a strength characteristic that is determined based on one or more properties of a user, as described elsewhere herein;
- the one or more properties of the user comprise one or more selected from the list consisting of the age of the user, the height of the user, and the weight of the user, as described elsewhere herein;
- in either of the above two instances, the circuitry is optionally further configured to obtain one or more images of the user, and determine at least one of the one or more properties of the user based on the one or more images of the user, as described elsewhere herein;
- similarly in either of the above two instances, alternatively or in addition optionally at least one of the one or more properties of the user is obtained from an external device, as described elsewhere herein;
- the characteristic of the virtual character may be determined based on information input by a user, as described elsewhere herein;
- the haptic output may comprise a vibration of a vibrating element in the input device, as described elsewhere herein;
- the haptic adjustment property may comprise one or more selected from the list consisting of a change in vibration strength, a change in vibration pattern, and a change in vibration frequency, as described elsewhere herein; and
- the haptic output may comprise a trigger resistance and the haptic adjustment property comprises a change in resistance strength, as described elsewhere herein;

Similarly, in a summary embodiment of the present description, a method of adjusting a haptic output signal comprises: generating a virtual environment comprising a virtual character, wherein actions performed by the virtual character are associated, according to a control scheme, with input signals from an input device operable to produce a haptic output, obtaining a haptic output signal corresponding to a state of the virtual environment, determining a characteristic of the virtual character, determining, based on the characteristic of the virtual character, a haptic adjustment property, performing processing to adjust the haptic output signal, responsive to the haptic adjustment property, and outputting the adjusted haptic output signal to the input device.

It will be apparent to a person skilled in the art that variations in the above method corresponding to operation of the various embodiments of the apparatus as described and claimed herein are considered within the scope of the present invention.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A computer-implemented method comprising:

generating a virtual environment comprising a virtual character whose actions produce haptic output;

obtaining a haptic output signal corresponding to a state of the virtual environment;

identifying a first haptic output property indicated by a haptic output signal;

determining a characteristic of the virtual character;

identifying a second haptic output property corresponding to the determined characteristic of the virtual character;

determining, based at least on the second haptic output property corresponding to the determined characteristic of the virtual character, a haptic adjustment property;

adjusting the haptic output signal based at least on the haptic adjustment property; and outputting the adjusted haptic output signal to an input device.

2. The method of claim 1, wherein the state of the virtual environment that corresponds to the haptic output signal comprises an interaction with the virtual character in the virtual environment.

3. The method of claim 2, wherein the interaction comprises supporting a virtual object.

4. The method of claim 1, wherein the characteristic of the virtual character comprises a strength characteristic that is associated with the virtual character.

5. The method of claim 1, wherein the characteristic of the virtual character is determined based at least on information that is received from an application that is running on a system.

6. The method of claim 1, wherein the characteristic of the virtual character is a strength characteristic that is determined based at least on one or more properties of a user.

7. The method of claim 6, wherein the one or more properties of the user comprise one or more of an age of the user, a height of the user, and a weight of the user.

8. A system comprising:

one or more processors, and one or more non-transitory computer-readable media that store instructions which, when executed by the one or more processors, cause the one or more processors to perform operations comprising:

generating a virtual environment comprising a virtual character whose actions produce haptic output;

obtaining a haptic output signal corresponding to a state of the virtual environment;

identifying a first haptic output property indicated by a haptic output signal;

determining a characteristic of the virtual character;

identifying a second haptic output property corresponding to the determined characteristic of the virtual character;

determining, based at least on the second haptic output property corresponding to the determined characteristic of the virtual character, a haptic adjustment property;

adjusting the haptic output signal based at least on the haptic adjustment property; and outputting the adjusted haptic output signal to an input device.

9. The system of claim 8, wherein the state of the virtual environment that corresponds to the haptic output signal comprises an interaction with the virtual character in the virtual environment.

10. The system of claim 9, wherein the interaction comprises supporting a virtual object.

11. The system of claim 8, wherein the characteristic of the virtual character comprises a strength characteristic that is associated with the virtual character.

12. The system of claim 8, wherein the characteristic of the virtual character is determined based at least on information that is received from an application that is running on a system.

13. The system of claim 8, wherein the characteristic of the virtual character is a strength characteristic that is determined based at least on one or more properties of a user.

14. The system of claim 13, wherein the one or more properties of the user comprise one or more of an age of the user, a height of the user, and a weight of the user.

15. One or more non-transitory computer-readable media that store instructions which, when executed by one or more processors, cause the one or more processors to perform operations comprising:

generating a virtual environment comprising a virtual character whose actions produce haptic output;

obtaining a haptic output signal corresponding to a state of the virtual environment;

identifying a first haptic output property indicated by a haptic output signal;

determining a characteristic of the virtual character;

identifying a second haptic output property corresponding to the determined characteristic of the virtual character;

determining, based at least on the second haptic output property corresponding to the determined characteristic of the virtual character, a haptic adjustment property;

adjusting the haptic output signal based at least on the haptic adjustment property; and outputting the adjusted haptic output signal to an input device.

16. The media of claim 15, wherein the state of the virtual environment that corresponds to the haptic output signal comprises an interaction with the virtual character in the virtual environment.

17. The media of claim 16, wherein the interaction comprises supporting a virtual object.

18. The media of claim 15, wherein the characteristic of the virtual character comprises a strength characteristic that is associated with the virtual character.

19. The media of claim 15, wherein the characteristic of the virtual character is determined based at least on information that is received from an application that is running on an system.

20. The media of claim 15, wherein the characteristic of the virtual character is a strength characteristic that is determined based at least on one or more properties of a user.

* * * * *